March 24, 1953 L. ELLER 2,632,333
PULLEY
Filed March 15, 1948 4 Sheets-Sheet 1
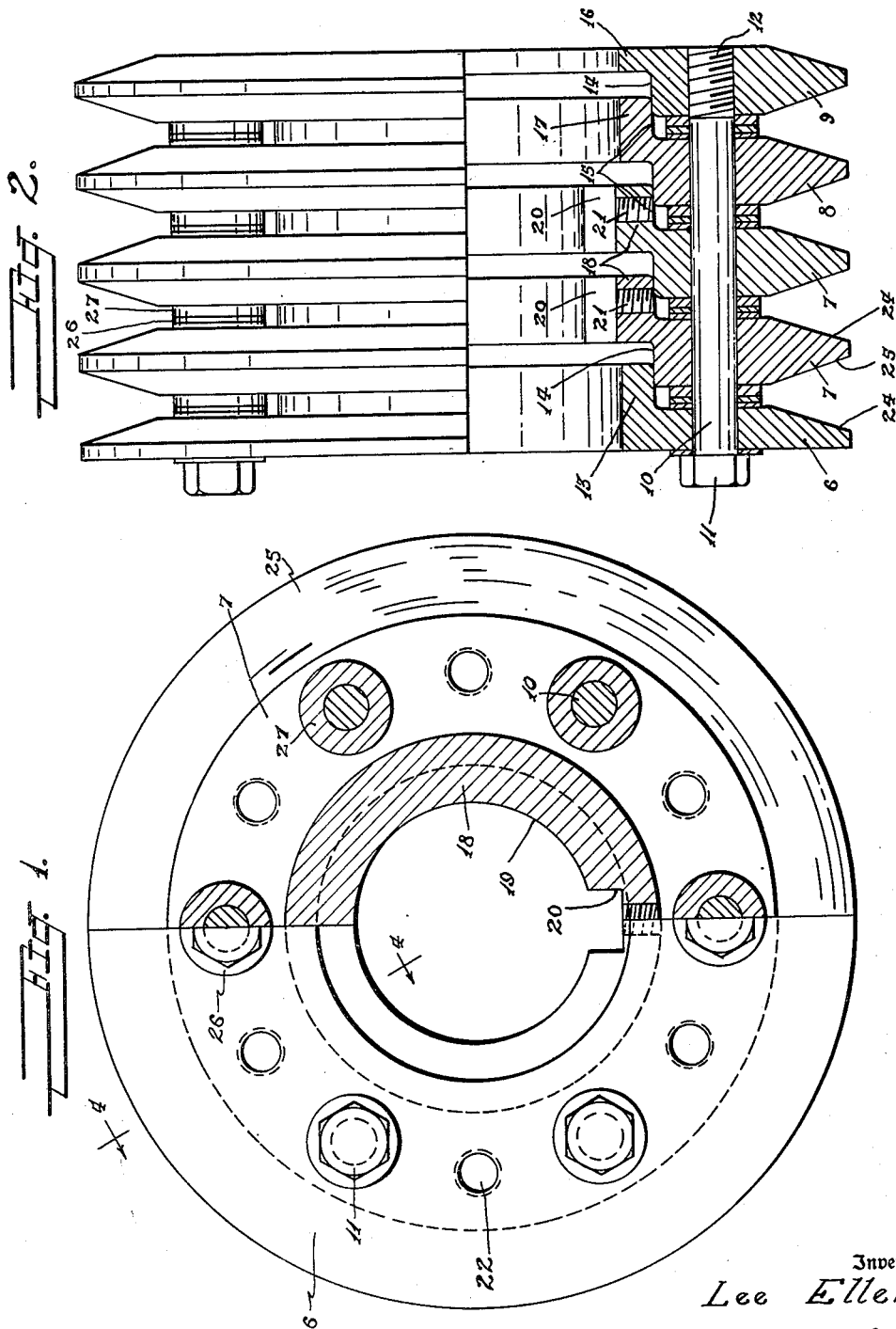
Inventor
Lee Eller
By Smith & Wells
Attorney March 24, 1953　　　　　　　L. ELLER　　　　　　　2,632,333
PULLEY Filed March 15, 1948　　　　　　　　　　　4 Sheets-Sheet 2

INVENTOR.
Lee Eller
BY
Smith & Wells

March 24, 1953 L. ELLER 2,632,333
PULLEY

Filed March 15, 1948 4 Sheets-Sheet 3

INVENTOR.
Lee Eller
BY
Smith & Wells

March 24, 1953 L. ELLER 2,632,333
PULLEY
Filed March 15, 1948 4 Sheets-Sheet 4
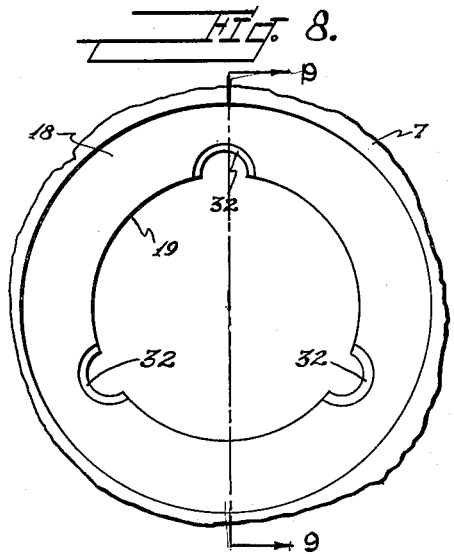
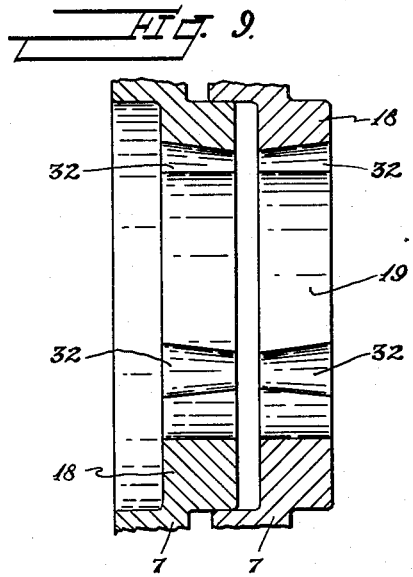
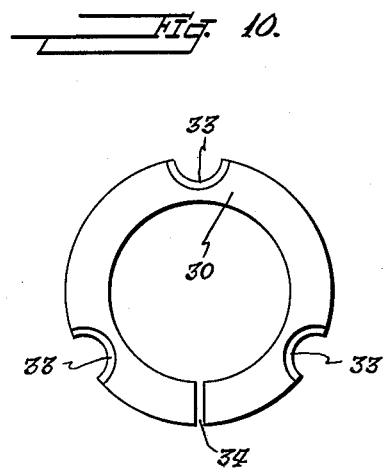
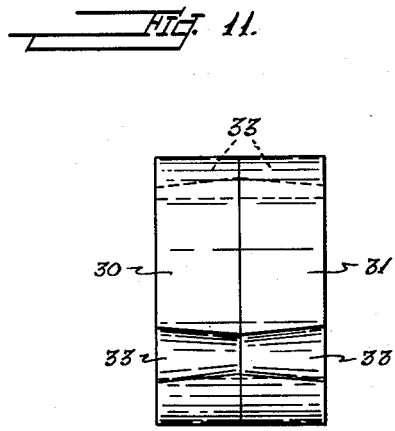
INVENTOR.
Lee Eller
BY
Smith & Wells Patented Mar. 24, 1953

2,632,333

UNITED STATES PATENT OFFICE 2,632,333

PULLEY

Lee Eller, Spokane, Wash., assignor of one-half to A. E. Rains, Spokane, Wash.

Application March 15, 1948, Serial No. 14,940

3 Claims. (Cl. 74—230.3)

My invention relates to improvements in a pulley.

It is the principal purpose of my invention to provide a sectionalized V groove pulley construction whereby single and multiple groove units are built up from standard stock sections in such a way as to be adjustable to various sizes of belts.

It also is the purpose of my invention to provide a pulley construction with means whereby wear on the belt engaging faces can be readily compensated for.

It is also a purpose of my invention to provide a novel means for mounting such devices as pulleys upon a shaft.

It is a further purpose of my invention to provide a sectionalized V groove pulley with means whereby cool air is drawn through the pulley close to the belt engaging surfaces to absorb the heat from the belt and thereby prolong the belt life and improve the performance thereof.

The nature and advantages of my invention will appear more fully from the following description and the accompanying drawings showing a preferred form of the invention. It is to be understood however, that the drawings and description are illustrative only and should not be considered as limiting the invention except insofar as it is limited by the claims.

In the drawings:

Figure 1 is an end view partly in section of a pulley unit embodying my invention;

Figure 2 is a side view half in elevation and half in section of the pulley unit;

Figure 8 is a fragmentary face view of a pulley section showing the formation of the hub for mounting means;

Figure 9 is a sectional view on the line 9—9 of Figure 8;

Figure 10 is an end view of one of the bushings used in the mounting means; and

Figure 11 is a side view of the bushing.

Figure 3:
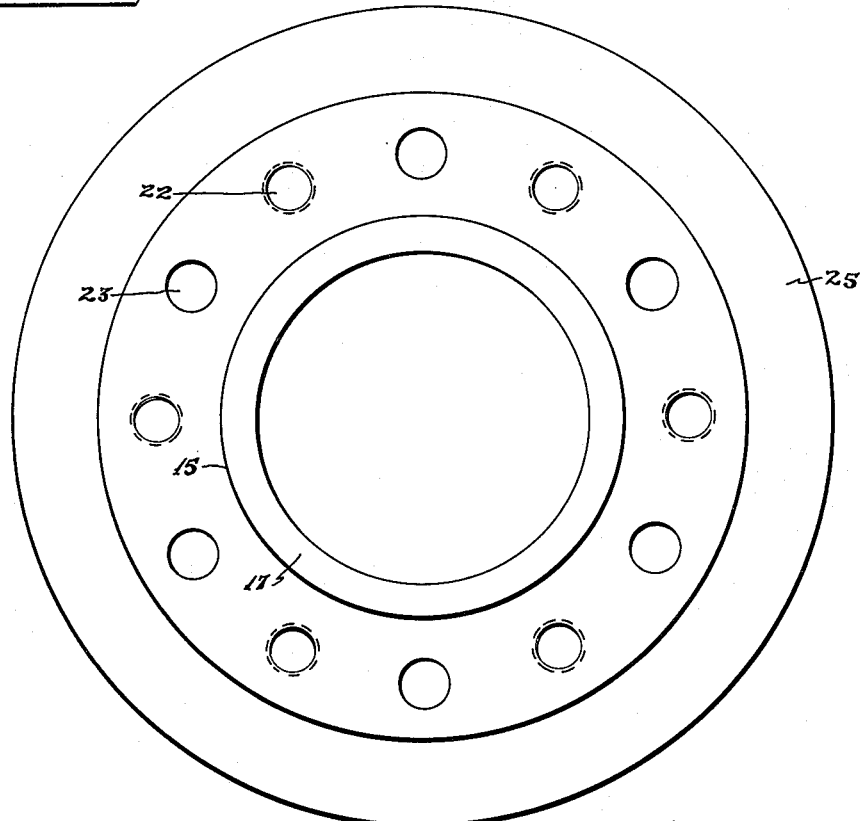
Figure 3 is a face view of one of the end units shown at the right hand end of Figure 2.
Figure 4:
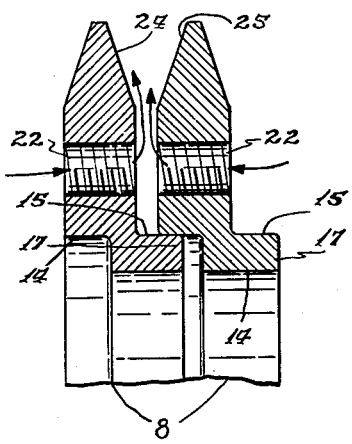
Figure 4 is a fragmentary sectional view taken on the line 4—4 of Figure 1 through a pair of standard stock sections and illustrating the circulation of air through the pulley.

Referring now to the drawings and particularly to Figures 1 and 2, my improved pulley unit is composed of a series of standard stock sections indicated at 6, 7, 8 and 9. The unit shown in Figure 2 utilizes two of the sections 7 and one each of the sections 6, 8 and 9 to produce a multiple grooved pulley having four belt grooves.

Some characteristics are common to each of the sections while other characteristics are individual. The sections are adapted to be held together by a plurality of bolts 10, which pass through all but one of the sections and thread into that section. The head 11 of the bolt serves to clamp the several sections against the section into which the threaded end 12 of the bolt is mounted.

In order to align the several pulley sections, the section 6 has an integral cylindrical flange 13 adapted to slidably fit an inner cylindrical surface 14 on an adjacent pulley section. The sections 7, 8 and 9, all have the inwardly facing cylindrical surface 14. The sections 7 and 8 also have outwardly facing surfaces 15 which are cylindrical and adapted to seat against the surface 14. The axial extent of the surfaces 14 and 15, being at least two-thirds of the thickness of the apertured intermediate portions of the sections is substantial in order to permit quite a wide variation in groove size to fit individual belts. The section 9 has the surface 14, and since it is an end section, the flange 13 is not needed. There is however, an inwardly extending rib 16 on this section whose inner diameter is the same as the inner diameter of the flange 13 of the section 6 and the flange 17 of the section 8. The sections 7 are shaft mounting sections and have their flanges 18 of considerably greater radial depth than the flanges 13 and 17 on the other sections. Such sections may have the inner faces 19 of the flanges 18 formed in any suitable fashion to cooperate with a shaft mounting means. In Figures 1 and 2 of the drawings, I have shown a simple key slot with a threaded aperture 21 for keying the pulley sections to a shaft. In Figures 6 to 11 I show a preferred form of mounting means for the pulleys.

It will be apparent that the various sections 6, 7, 8 and 9 may be used in different combinations to obtain the desired number of pulley grooves. It is also important in a sectionalized pulley of this character to be able to thread the bolts 10 into any desired section for clamping other sections thereto. Each section is provided with six threaded apertures 22 which are drilled and tapped to receive the threads of the bolts 10. The threaded apertures are accurately spaced sixty degrees apart throughout the circumference of the sections. Each section is also provided with six apertures 23 which are drilled to the proper size to receive the bolt 10. These apertures are spaced apart sixty degrees and are located half way between the apertures 22. All of the apertures are equally spaced from the axis of the pulley. With this arrangement of the apertures 22 and 23, any two or more of the pulley sections may be bolted together.

The spacing of the sections to determine the groove width between the tapered faces 24 and 25 of adjacent pulley sections, is governed by washers 26 and 27. The washers 26 are relatively thin while the washers 27 are thicker. For example, the thick washers may be three thirty-seconds of an inch in thickness while the thin washers are one thirty-second of an inch thick. The three washers provide a space range between sections from one thirty-second inch to five thirty-seconds inch. The washers are placed around the bolts as shown in Figure 2 so that when the bolts are tightened proper spacing of the pulley sections will be had.

In any assembly of the pulley sections it will be noted that only half of the apertures in each section will be used. The other apertures are aligned with each other so that air will pass through them and since the rotation of the pulley sets up a centrifugal force on the air between the pulley sections, cool air will be drawn in through the aperture and pass outwardly between pulley sections to cool the belt and the pulley sections by removing the heat of friction of the belt on the pulley. By maintaining the sections cool, the belt is cooled thus giving it a longer life and reducing the tendency of the belt to soften and drop deeper into the groove. If a belt softens and sinks deeper into the pulley groove, this changes the speed ratio and results in an overloading of the belt. The cooling of the pulley and the belt thus is highly advantageous in prolonging the life and efficiency of a particular drive.

The washers 26 and 27, when combined with the pulley sections as hereinbefore described, are also useful as a means to compensate for wear of the faces 24 and 25 of the pulley sections. When the pulley faces become worn, the removal of a thin washer 26 around each bolt between the pulley sections will compensate for the wear.

Figure 5:
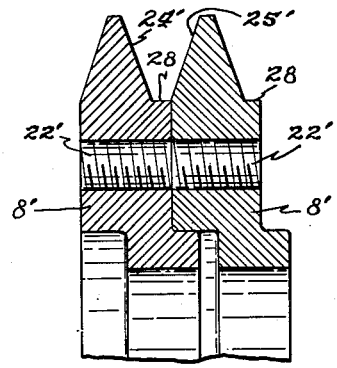
Figure 5 is a similar section view to Figure 4 but showing a pulley of modified form.
Figure 6:
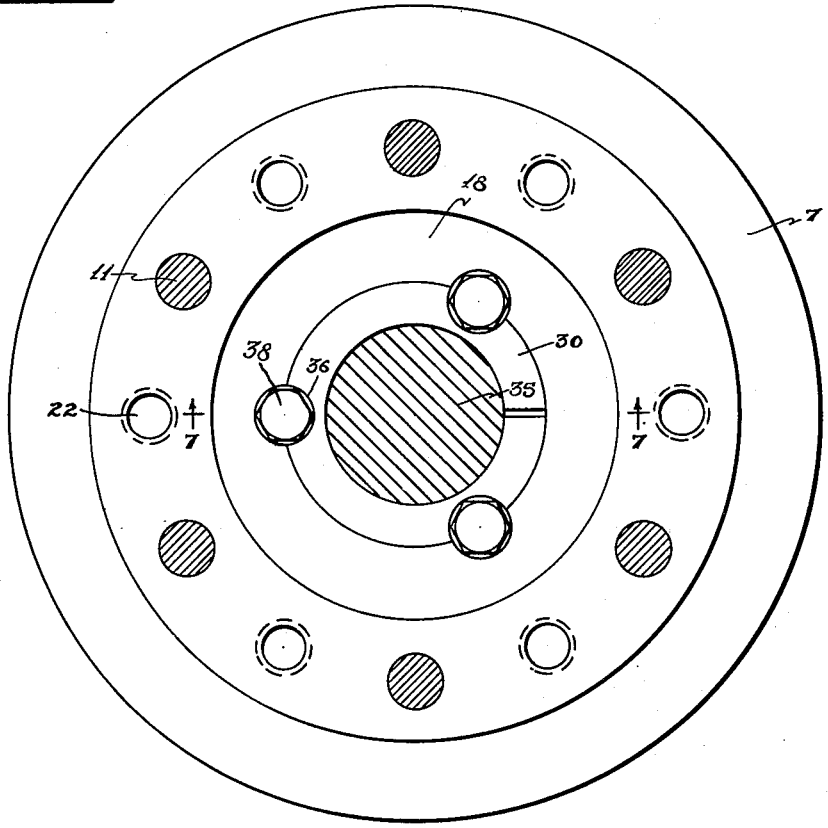
Figure 6 is a face view of a pulley assembly and a further means for mounting it upon a shaft.
Figure 7:
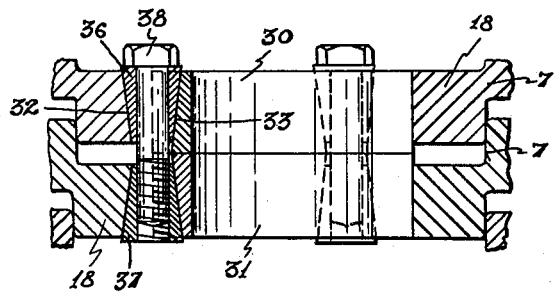
Figure 7 is a sectional view taken on the line 7—7 of Figure 6.

In some instances it is desirable to have a flat surface at the bottom of the V grooves in a pulley. Figure 5 of the drawings illustrates two of the pulley sections 8' which in addition to the surfaces 24' and 25' have a cylindrical surface 28 at the base of the surface 24'. These pulley sections are shown without any spacing washers between them, but of course such washers can be used here as in the main form of the invention.

Referring now to Figures 6 to 11 inclusive, the preferred mounting means for the pulleys will be described. This mounting means is made to cooperate with the pulley sections 7 which have the thickened flanges 19. The improved mounting means comprises a pair of split bushings 30 and 31 which are placed back to back within the pulley sections 7. The pulley sections 7 as shown best in Figure 8, are provided with three tapered channels 32 in their inner surfaces 19. These tapered channels decrease in cross section toward the center line between the pulley sections. The bushings 30 and 31 are alike and have tapered channels 33 in their outer surfaces. Preferably the channels 32 in the pulley sections and the channels 33 in the bushings are spaced apart 120 degrees. One of the channels 33 is directly opposite the opening 34 in the bushing.

The bushings and the pulley sections are secured together upon a shaft 35 by using pairs of tapered tubular bushings 36 and 37. The tubular bushing 36 is smooth bored to receive a bolt 38 which is threaded for about half of its length. The tubular bushing 37 is internally threaded to receive the threaded portion of the bolt 38. It is evident that when the bushings 36 and 37 are drawn together they will tend to force the split bushings 30 and 31 together and will also clamp these bushings to the shaft 35. Also the bushings 36 and 37, by their tapered engagement in the channels 32 of the pulley sections 7, will center the bushing 30 and 31 with respect to the pulley sections.

With this type of mounting for the pulleys, the sections 7 may be adjusted toward and away from each other by the use of the washers 26 and 27. This adjustment does not interfere with the clamping of the pulley to the shaft. The split bushing 30 and 31 will decrease in circumference slightly after they are clamped on a shaft. This decrease however, is not sufficient to cause enough disalignment of the channels 33 in the bushings with respect to the channels 32 in the pulley sections to cause any trouble. It will be noted that the axial dimension of the tubular bushing 36 and 37 is somewhat less than that of the split bushing 30 and 31 so that there is ample space between the bushing 36 and 37 to enable them to perform their locking function.

It is believed that the nature and advantages of my invention will be apparent from the foregoing description.

Having thus described my invention I claim:

1. A sectionalized pulley of the character described comprising, in combination, a plurality of circular pulley sections each having an outer belt receiving portion bevelled to receive a V-belt, an intermediate body portion, and having a circular row of equally spaced apertures extending therethrough, alternate apertures in said row being threaded, and the other apertures being large enough to receive a bolt threaded to fit the threaded apertures, at least all but one of said sections having an axially extending circular flange at the inner circumference of the body portion, the flange having a cylindrical outer surface, at least all but one of said sections having a cylindrical inwardly facing surface on the body portion with which the cylindrical outer surface of the flange of an adjacent section engages, spacing members interposed between the intermediate body portions of adjacent pulley sections limiting the amount of overlap of the cylindrical surfaces of said sections, said spacing members being spaced apart circumferentially of the pulley, and headed bolts extending through the spacing members and the unthreaded apertures of all but one section and threaded into that section.

2. A sectionalized pulley of the character described comprising, in combination, a plurality of circular pulley sections each having an outer belt receiving portion bevelled to receive a V-belt, an intermediate body portion, and having a circular row of equally spaced apertures extending therethrough, alternate apertures in said row being threaded, and the other apertures being large enough to receive a bolt threaded to fit the threaded apertures, at least all but one of said sections having an axially extending circular flange at the inner circumference of the body portion, the flange having a cylindrical outer surface, at least all but one of said sections having a cylindrical inwardly facing surface on the body portion with which the cylindrical outer surface of the flange of an adjacent section engages, and headed bolts extending through the unthreaded apertures of all but one section and threaded into that section, and washers on the bolts between the sections holding the adjacent body portions in spaced relation to each other.

3. A sectionalized pulley comprising in combination, intermediate pulley sections each having an outer annular portion bevelled on both sides to receive the adjacent sides of two V-belts, each of said sections having an annular intermediate portion of uniform thickness provided with a circular row of equally spaced apertures extending therethrough, alternate apertures in said row being threaded and the other apertures being of a size to fit a bolt threaded to fit the threaded apertures, said sections each having an inwardly facing cylindrical surface extending from one side face of the intermediate portion toward the other side face of said portion a distance more than half the thickness of said portions, said sections each having an integral annular flange inwardly of and laterally offset from the intermediate portion, the flange having an outwardly facing cylindrical surface extending into the intermediate portion of an adjacent section, one end pulley section having an outer annular portion bevelled to receive a side of a V-belt and having an intermediate portion of the same thickness and with the same apertures as the intermediate portions of said intermediate pulley sections, said end section having an inner cylindrical surface to receive the flange of an adjacent intermediate section, another end pulley section having an outer annular portion bevelled on one side to receive a side of a V-belt and having an intermediate portion with the same apertures as the intermediate portions of said intermediate pulley sections, said last named section having a flange projecting from the side on which it is bevelled, to extend into the intermediate portion of the adjacent intermediate section, bolts extending through the unthreaded apertures in one end section and the intermediate sections and threaded in the threaded apertures of the other end section, and spacer washers on each bolt between the several sections spacing the intermediate portions apart a distance less than the width of said inwardly facing annular surfaces, whereby to provide air circulation passages between the several sections into which air may flow through the apertures in said sections not occupied by bolts.

LEE ELLER.

REFERENCES CITED

The following references are of record in the file of this patent:

UNITED STATES PATENTS

| Number | Name | Date |
|---|---|---|
| 968,876 | Morrissy et al. | Aug. 30, 1910 |
| 1,031,106 | Camp | July 2, 1912 |
| 1,371,212 | Adams et al. | Mar. 15, 1921 |
| 1,393,261 | Casey | Oct. 11, 1921 |
| 1,952,884 | Nichols | Mar. 27, 1934 |
| 2,014,681 | Grauer | Sept. 17, 1935 |
| 2,209,737 | Livingston | July 30, 1940 |
| 2,254,045 | Nylin | Aug. 26, 1941 |
| 2,407,032 | Myers | Sept. 3, 1946 |
| 2,417,467 | Bryant, Jr. | Mar. 18, 1947 |
| 2,427,172 | Williams | Sept. 9, 1947 |
| 2,500,515 | Browning | Mar. 14, 1950 |